United States Patent [19]

Robertson et al.

[11] Patent Number: 4,491,481
[45] Date of Patent: Jan. 1, 1985

[54] ORGANIC PIGMENT COMPOSITIONS CONTAINING AN AZO COMPOUND WITH A HETEROCYCLIC SUBSTITUENT

[75] Inventors: George H. Robertson, Paisley, Scotland; David Price, Alderley Edge; Raymond N. Birrell, Sale, both of England

[73] Assignee: Ciba-Geigy Corporation, Ardsley, N.Y.

[21] Appl. No.: 189,878

[22] Filed: Sep. 23, 1980

Related U.S. Application Data

[63] Continuation of Ser. No. 21,867, Mar. 19, 1979, abandoned, which is a continuation of Ser. No. 861,387, Dec. 16, 1977, abandoned, which is a continuation of Ser. No. 655,590, Feb. 5, 1976, abandoned.

[30] Foreign Application Priority Data

Feb. 12, 1975 [GB] United Kingdom ............... 6041/75

[51] Int. Cl.$^3$ ............... C09D 11/00; C09D 3/00; C09D 17/00; C09B 67/00
[52] U.S. Cl. ............... 106/288 Q; 106/23; 106/288 Q; 106/308 F; 106/308 Q; 534/757; 534/761; 534/763; 534/765; 534/766; 534/768; 534/770; 534/778
[58] Field of Search ............... 106/288 Q, 308 Q, 22, 106/23, 308 F; 260/152, 155, 156, 157, 160, 162, 163

[56] References Cited

U.S. PATENT DOCUMENTS

| | | | |
|---|---|---|---|
| 2,752,254 | 6/1956 | Drautz | 106/14.5 |
| 3,445,453 | 5/1969 | Stocker | 260/193 |
| 3,446,641 | 5/1969 | Mitchell et al. | 106/288 Q |
| 3,617,171 | 11/1971 | Ribka | 8/26 |
| 3,725,101 | 4/1973 | Kuhne et al. | 106/288 Q |
| 3,759,731 | 9/1973 | Kuhne et al. | 106/288 Q |
| 3,759,733 | 9/1973 | Bradley et al. | 106/288 Q |
| 3,776,749 | 12/1973 | McKay et al. | 106/288 Q |
| 3,877,957 | 4/1975 | Bradley et al. | 106/288 Q |
| 3,926,943 | 12/1975 | Dimroth et al. | 260/152 |

Primary Examiner—Floyd D. Higel
Attorney, Agent, or Firm—Harry Falber

[57] ABSTRACT

A pigment composition comprising
(a) an organic pigment and
(b) from 0.5% to 20% by weight, based on the weight of organic pigment, of a pigment derivative having the formula:

$$A-[N=N-B]_n$$

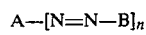

wherein n is 1 or 2, A is an aryl or heterocyclic residue, B is an aryl or heterocyclic residue and wherein A and/or B contains a residue having the formula:

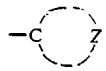

wherein Z is a group of atoms necessary to complete a benzimidazole, pyridine, benzodiazepine, quinoline, isoquinoline or naphthimidazole residue, gives printing inks and especially paint media having improved tinctorial strength, gloss and especially improved rheological properties.

15 Claims, No Drawings

ORGANIC PIGMENT COMPOSITIONS CONTAINING AN AZO COMPOUND WITH A HETEROCYCLIC SUBSTITUENT

This is a continuation of application Ser. No. 021,867 filed on Mar. 19, 1979, now abandoned which is a continuation of Ser. No. 861,387, filed on Dec. 16, 1977 (now abandoned), which is a continuation of Ser. No. 655,590, filed on Feb. 5, 1976 (now abandoned).

The present invention relates to new pigment compositions.

Untreated organic pigments are generally deficient in such pigmentary properties as tinctorial strength and also have a tendency to flocculate in surface coating media.

It is already known that the addition to organic pigments of certain azo compounds containing basic groups, provides organic pigment compositions having improved pigmentary properties compared to the untreated pigment. Such known techniques are described in British Patent Specification Nos. 1,138,465 and 1,139,294.

We have now found that particular pigment derivatives containing a heterocyclic residue which contains at least one basic nitrogen atom, when incorporated into an organic pigment, provide pigment compositions having improved pigmentary properties, especially in oil-based media.

Accordingly, the present invention provides a pigment composition comprising
(a) an organic pigment and
(b) from 0.5% to 20% by weight, based on the weight of organic pigment, of a pigment derivative having the formula:

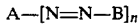

A—[N=N—B]$_n$     I wherein n is 1 or 2, A is an aryl or heterocyclic residue, B is an aryl or heterocyclic residue and wherein A and/or B contains a residue having the formula:

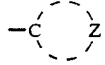

II wherein Z is a group of atoms necessary to complete a benzimidazole, pyridine, benzodiazepine, quinoline, isoquinoline, or naphthimidazole residue.

The organic pigment, component (a) of the compositions of the present invention, may be an anthraquinone, a quinacridone or phthalocyanine pigment but is preferably an azo pigment, such as a naphthol or arylamide azo pigment, and particularly preferably an arylamide azo pigment.

Examples of preferred mono-arylamide azo pigments include those obtained by coupling the diazonium compounds derived from amines such as 4-nitroaniline, 2,4-dichloroaniline, 2,4,5-trichloroaniline, 4-chloro-2-nitroaniline, 2-nitroaniline, 4-methyl-2-nitroaniline, 4-chloro-2-methylaniline, 2-methoxy-4-nitroaniline, 2-ethoxy-4-nitroaniline, 2-methyl-4-nitroaniline, 2-chloro-4-nitroaniline, 2,4-dinitroaniline with acetoacetarylamides such as acetoacetanilide, acetoacet-m-xylidide, acetoacet-o-chloroanilide, acetoacet-o-anisidide, acetoacet-o-phenetitide, acetoacet-5-chloro-2,4-dimethoxy-anilide, acetoacet-2,5-dimethoxy-anilide, acetoacet-2,5-dimethoxy-4-chloranilide, acetoacet-o-toluidide, acetoacet-o-toluidide and acetoacet-p-phenetidide. Preferred diarylamide azo pigments, include those obtained by coupling the diazonium compounds derived from 3,3'-dichlorobenzidine, 3,3'-dimethoxybenzidine, 3,3',5,5'-tetrachlorobenzidine, 4,4'-diaminodiphenylmethane or 4,4-diamino-diphenylsulphone with an acetoacetarylamide as listed above, or a bis-acetoacetarylamide e.g. 1,4- or 1,3-bis-acetoacetphenylenediamine coupled with a mono amine listed above.

Examples of suitable naphthol azo pigments are those produced by coupling a diazotized or tetrazotized mono- or diamine, as listed hereinbefore, with β-naphthol or a 3-hydroxynaphthoic acid arylamide such as
3-hydroxy-2-naphthanilide
3-hydroxy-2-naphth-(2-methyl)-anilide
3-hydroxy-2-naphth-(2-methoxy)-anilide
3-hydroxy-2-naphth-(2-methyl-4-chloro)-anilide.

With regard to component (b) of the composition of the present invention residue A can be derived either from an amine $A(NH_2)_n$ or a coupling component $A(H)_n$, where n = 1 or 2.

When A is the residue of a diazo or tetrazo component $A(NH_2)_n$ then preferred aryl residues A are naphthyl and especially phenyl and diphenyl residues, each optionally substituted by one or more substituents. Examples of suitable substituents are halogen atoms, especially chlorine and bromine atoms, alkyl groups having from 1 to 6 carbon atoms, particularly methyl groups, alkoxy groups having from 1 to 6 carbon atoms especially methoxy groups, nitro, carboxylic acid and sulphonic acid groups, alkali metal carboxylate, alkali metal sulphonate and arylazo groups.

Suitable specific diazo or tetrazo residues A which do not contain a residue of formula II are those derived from the amines, described hereinbefore, as examples of amine precursors for preferred mono- and diarylamide azo pigments forming preferred components (a) of the pigment compositions of the invention. Other suitable amines are the sulpho- and carboxy-substituted anilines e.g. 4-methylaniline-2-sulphonic acid, 4-chloro-5-methylaniline-2-sulphonic acid, 4-methyl-5-chloroaniline-2-sulphonic acid and aniline-4-carboxylic acid.

When A is the residue of a coupling component $A(H)_n$ wherein n is 1, and containing no residue of formula II, it is preferably the residue of an acetoacetyl arylamide, 1-aryl-pyrazol-5-one, β-naphthol or 3-hydroxy-2-naphthoic acid anilide, each of which residues may be either unsubstituted or substituted with one or more of the substituents described hereinbefore in relation to aryl residues A for $A(NH_2)_n$ above.

On the other hand, when A is the residue of a coupling component $A(H)_n$ and n is 2, and containing no residue of formula II it is preferably the residue of a 1,3- or 1,4-bisacetoacetyl-phenylene diamine in which the phenylene nucleus may be unsubstituted or substituted with one or more of the substituents as aforesaid.

Residues B which are free from groups of formula II may be derived from a monofunctional diazo compound or a coupling component depending upon the role of its counterpart, residue A. Thus when residue A is derived from a coupling component, preferred diazo residues B are the same as those residues derived from the preferred monoamines forming precursors for the preferred monoarylamide pigment components (a) of the compositions of the present invention. Similarly, when A is derived from a diazo or tetrazo component, the preferred counterpart, coupling component BH, is the same as the preferred coupling components $A(H)_n$ wherein n is 1, as described hereinbefore in relation to compound A(H)$_n$.

As specific examples of coupling compounds A(H)$_n$ or B(H)$_n$ containing no residue of formula II, the following compounds may be mentioned:

acetoacetanilide
acetoacet-o-toluidide
acetoacet-o-chloroanilide
acetoacet-m-xylidide
acetoacet-4-chloro-2,5-dimethoxyanilide
2-hydroxy-3-naphthoic acid anilide
1-phenyl-3-methyl-5-pyrazolone Preferred specific diazo or coupling components which contain a residue of formula II are those falling within the following groups 1-3.

(1) Benzimidazole type (i) Diazo components having the formula:

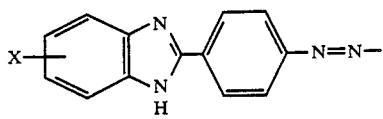

III wherein X is hydrogen or a substituent listed for A(NH$_2$)$_n$ of component (b)

(ii) Coupling components having the formula:

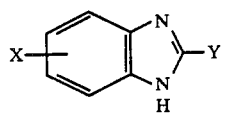

IV wherein X has its previous significance and Y is —CH$_2$—CN, —CH$_2$—COCH$_3$ or —NHCOCH$_2$—COCH$_3$.

(2) Pyridine type (i) Diazo components having the formula:

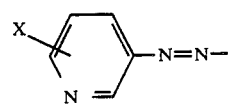

V wherein X has its previous significance.

(ii) Coupling components having the formula:

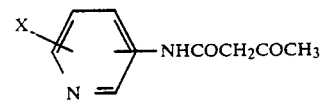

VI wherein X has its previous significance e.g. 2-, 3- and 4-aminopyridine derivatives or (iii)

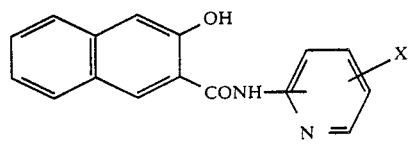

VII wherein X has its previous significance.

(3) Benzodiazepine groups (i) Coupling components having the formula:

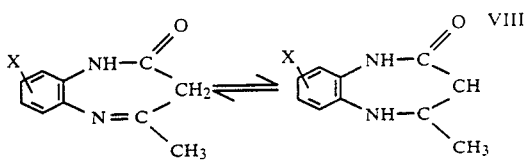

VIII wherein X has its previous significance.

The pigment derivatives of formula I may be produced by reacting a diazonium or tetrazonium compound derived from A(NH$_2$)$_n$[or B(NH$_2$)] with a coupling component BH or A(H)$_n$ respectively. The processes used are those conventional for the formation of azo pigments.

Pigment compositions may be produced by any of a variety of techniques. For instance, the separately-produced organic pigment [component (a)] and the pigment derivative I [component (b)] may be blended together, as dry powders.

Preferably, however, the pigment compositions of the invention are prepared by contacting, in an aqueous medium, components (a) and (b) of the composition. Depending upon the desired properties of the end composition, the aqueous contacting may be effected by different methods.

In preferred methods, components (a) and (b) may be contacted under aqueous conditions using one of the following techniques:

(i) mixing separately prepared aqueous slurries of components (a) and (b)

(ii) forming component (a) in the presence of component (b)

(iii) forming component (b) in the presence of component (a)

(iv) adding an acidic solution or dispersion preferably an acetic acid solution or dispersion of component (b) to component (a).

Although in these preferred stepwise methods it is not necessary that the diazo or tetrazo component of component (b) be the same as component (a), and, in fact, each of residues A and B can contain a residue of formula II, it is preferable for best results, that the structure of component (b) should approach that of component (a) as closely as possible.

A second preferred, aqueous process comprises, in one embodiment, coupling one or more diazonium or tetrazonium compound of formula:

$$A—(^{\oplus}N\equiv N^{\ominus}halogen)_n \qquad IX$$

wherein A and n have their previous significance, with one or more coupling components having the formula BH wherein B has its previous significance.

If two different coupling components BH one of which contains the residue

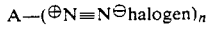

are used, the preferred process of the invention may, if desired, be conducted in a stepwise manner. Thus, for example, a diazonium or tetrazonium compound of formula IX may be first coupled with one coupling component and then with the second different coupling component. Alternatively, if two different diazonium or tetrazonium compounds of formula IX are used, then one diazonium may be coupled first with the coupling component followed by the second diazonium or tetrazonium compound.

It is preferably and more convenient however to carry out the preferred process of the invention using a mixed coupling technique, that is coupling a mixture of coupling components, at least one of which contains a residue of formula II, directly with a diazonium and/or tetrazonium compound. The diazonium and/or tetrazonium compound may be a single compound or a mixture of such compounds. Moreover, the diazonium and/or tetrazonium compound may contain a residue of formula II, or may be free from this residue. Alternatively, a mixture of diazonium and/or tetrazonium compounds, at least one of which contains a residue of formula II, may be coupled with a coupling component. The coupling component may be a single compound or a mixture of such compounds and the coupling component may contain a residue of formula II or may be free from such a residue.

The actual components of the pigment composition of the present invention will depend upon the nature and number of the diazonium and/or tetrazonium compounds and coupling components used as starting-materials.

In a preferred instance, a single diazonium or tetrazonium compound of formula IX, wherein A and n have their previous significance, may be coupled with a mixture of two coupling components $B_1H$ and $B_2H$ wherein $B_1$ and $B_2$ are two different residues B, as hereinbefore defined, and wherein one of $B_1$ and $B_2$ contains a residue of formula II.

This process provides a pigment composition according to the invention containing the following constituents:

$A-N=N-B_1$ and $A-N=N-B_2$ wherein A, $B_1$ and $B_2$ have their previous significance.

Alternatively two different diazonium compounds of formula IX may be coupled with a single coupling component of formula BH to give a composition comprising the following constitutents:

$A_1-N=N-B$
$A_2-N=N-B$ wherein B has its previous significance and $A_1$ and $A_2$ are two different residues A as hereinbefore defined and one of which contains a residue of formula II.

As a further possibility, a single tetrazonium compound of formula $A-(^{\oplus}N\equiv N^{\ominus}halogen)_2$ may be coupled with a mixture of two coupling components of formula BH. As another possibility, a single difunctional coupling component of formula $AH_2$ may be coupled with a mixture of two diazonium compounds $B_1-^{\oplus}N\equiv NCl^{\ominus}$ and $B_2-^{\oplus}N\equiv NCl^{\ominus}$, wherein $B_1$ and $B_2$ are two different residues B as hereinbefore defined and wherein one of $B_1$ and $B_2$ contains a residue of formula II. In each of these latter reaction schemes there is obtained a composition having the following components:

$B_1-N=N-A-N=N-B_1$ $B_1-N=N-A-N=N-B_2$ $B_2-N=N-A-N=N-B_2$ wherein A, $B_1$ and $B_2$ have their previous significance.

In each of these different techniques, coupling procedures are selected which ensure an easy and complete reaction. Thus coupling components such as acetoacetarylamides or pyrazolones are preferably coupled between pH 3.5–5.0 whereas substituted naphthols are advantageously coupled at pH > 5.0. After completing the coupling reaction the products may be isolated in a convenient manner by raising the temperature for instance to a temperature within the range of from 20° to 100° C., filtering off the solid material and drying it.

The process employed to produce a composition of the invention can be influenced by the end use to which the pigment composition will be put. Thus when component (a) is prepared in the presence of component (b) and especially when a mixed coupling technique is employed the resultant composition, possibly by virtue of particle and crystal size control gives optimal tinctorial strength and transparency which properties are important e.g. in printing ink media. In the foregoing multistage process in which the component (a) is prepared before component (b) is added the aqueous slurry of the former may be heated to, for example, 90°–100° C. before incorporation of component (b). This method inhibits any control on the particle or crystal size of component (a) and therefore facilitates the production of pigments of increased particle and crystal size, which are particularly advantageous for use in media such as paint systems.

The pigment compositions of the present invention have excellent applicational properties. Thus the pigment compositions of the invention have improved tinctorial strength, gloss and especially improved rheological properties e.g. flow properties in ink and especially paint media. The improved rheological properties are seen to advantage in the speed of obtaining the dispersion and the amount of the dispersion which can be removed from the mill. Alternatively, higher pigment concentrations may be used in the dispersion process. In either case, commercial advantage is gained in the improved rate of manufacture. Particularly suitable ink media are gravure inks and viscous printing inks and paint media which are especially of interest are long and short oil alkyd paints.

The following Examples further illustrate the present invention. Parts shown therein are by weight unless otherwise stated. Parts by weight shown therein bear the same relation to parts by volume as do kilograms to liters.

EXAMPLE 1

A diazonium solution was prepared from 30.4 parts 3-nitro-4-amino toluene in 200 parts of water and 49.0 parts of 10N hydrochloric acid by the addition of 14.0 parts of sodium nitrite in 50 parts of water at a temperature between −2° and 0° C. over about 4 hours. The resulting diazonium solution was treated with activated carbon, filtered and made up to 500 parts with water at 0° C.

A coupling component solution was prepared from 34.6 parts of aceto-acetanilide and 1.8 parts of 4,7-dihydro-5-methyl-7-oxo-1H-2,3-benzo-1,4-diazepine dissolved in 450 parts of water containing 8.2 parts of sodium hydroxide.

The two solutions were coupled together by running them simultaneously into 500 parts of water containing 7.0 parts of sodium acetate trihydrate and 3.0 parts of glacial acetic acid. The rates of addition were adjusted so that the pH was maintained between 4.5 and 5.0 and so that no excess diazonium compound could be detected. When the coupling was complete the slurry was heated to 70° C., held at this temperature for 1 hour, and then filtered, washed and dried at 50° C.

When 16 parts of the pigment composition so obtained was milled into 22.4 parts of a decorative paint long oil alkyd resin and 40.6 parts of white spirit with 250 parts of Steatite 10 mm balls for 16 hours, a fluid mill base was obtained which gave a mill discharge of greater than 80%. Whereas, if a control pigment composition was prepared exactly as above but replacing the benzodiazepine by an equivalent quantity of aceto-acetanilide, then on ball milling in the same manner a thixotropic mill base was obtained which could only be discharged in less than 10% yield.

When the pigment composition so obtained was dispersed at 28% concentration in a typical litho varnish, the resulting ink had a yield value of 1,500 dynes/cm$^2$ and a viscosity at a shear rate of 0.573 sec$^{-1}$ of 4,700 poise, whereas control material prepared in the same way but without the benzodiazepine additive gave a yield value of 2,600 dynes/cm$^2$ and a viscosity of 9,100 poise.

The 4,7-dihydro-5-methyl-7-oxo-1H-2,3-benzo-1,4-diazepine starting-material was prepared as described by Ried and Stahlhofen, Chem. Ber. 1957, 90,828.

EXAMPLE 2

A diazonium solution was prepared from 28.9 parts of 3-nitro-4-amino toluene in the same way as Example 1.

A second diazonium solution was prepared from 0,9 parts of 3-aminopyridine in 20 parts of water containing 3.0 parts of 10N hydrochloric acid by the addition of 0.7 parts of sodium nitrite in 5 parts of water at 0° C.

A coupling component solution was prepared from 36.5 parts of acetoacetanilide dissolved in 450 parts of water containing 8.2 parts of sodium hydroxide.

The first diazonium solution and the coupling component solution were coupled together by running them down simultaneously into a solution of 6.8 parts of sodium acetate trihydrate and 3.0 parts of glacial acetic acid in 150 parts of water maintaining the rates of addition such that the pH was maintained between 4.5 and 5.0 and no excess diazonium compound was encountered. After the first diazonium solution had been added, coupling was continued using the second solution. When the coupling was complete the pigment slurry was heated to 70° C. and held at this temperature for 1 hour, then filtered washed and dried at 50° C.

The resulting composition had much better application flow properties than a control prepared in an analogous manner by replacing the aminopyridine by an equivalent quantity of 3-nitro-4-amino toluene. For instance when tested as described in Example 1 in decorative paint, a ball mill discharge of 77% was obtained compared with less than 10% for the control.

EXAMPLE 3

A diazonium solution was prepared from 28.9 parts of 3-nitro-4-amino toluene in the same way as described in Example 1.

A second diazonium solution was prepared from 2.1 parts of 2-(p-amino phenyl)-benzimidazole in 20 parts of water containing 3.0 parts of 10N hydrochloric acid by the addition of 0.7 part of sodium nitrite at 0° C.

A coupling component was prepared as in Example 2 and the coupling was carried out in exactly the same manner as disclosed in Example 2 except that the second diazonium solution was added before the first. The pigment composition was worked up and isolated as in Example 2.

The resulting composition had much better application flow properties than a control product prepared in an analogous manner by replacing the 2-(p-amino phenyl)benzimidazole by an equivalent quantity of 3-nitro-4-amino toluene. For instance, when tested as shown in Example 1 in decorative paint, a ball mill discharge of 82% was obtained compared with less than 10% for the control.

EXAMPLE 4

A pigment composition was prepared exactly as described in Example 1 except that the 1.8 parts of 4,7-dihydro-5-methyl-7-oxo-1H-2,3-benzo-1,4-diazepine were replaced by 3.0 parts of 2-(4-acetoacetamino)-phenylbenzimidazole.

The resulting composition had much superior application flow and gloss properties than a control material. For instance, when tested as in Example 1 in decorative paint, a ball mill discharge of 87% was obtained compared with less than 10% for the control.

EXAMPLE 5

A diazonium solution was prepared from 30.4 parts of 3-nitro-4-amino toluene by the method described in Example 1.

A coupling component solution was prepared by dissolving 33.1 parts of acetoacetanilide in 400 parts of water containing 7.8 parts of sodium hydroxide.

A second coupling component solution was prepared by dissolving 1.8 parts of 2-acetoacetaminopyridine in 50 parts of water containing 0.4 part of sodium hydroxide.

The diazonium solution and the first coupling component solution were coupled together by running them simultaneously into 500 parts of water containing 3.0 parts of glacial acetic acid and 3.3 parts of sodium acetate trihydrate. The rates of addition were adjusted so that the pH was maintained between 4.5 and 5.0 and so that no excess of diazonium compound could be detected. When all the first coupling component had been consumed, coupling was continued using the second coupling component. When coupling was complete, the slurry was heated to 70° C. and held at 70° C. for 1 hour. The pigment was then filtered, washed and dried at 50° C.

The pigment composition thus prepared had superior flow properties in application systems for instance when tested in decorative paint by the method described in Example 1—it gave a mill discharge of 88% whilst the control sample gave less than 10% under the same conditions.

EXAMPLE 6

The diazonium compound was prepared from 149.7 parts 3-nitro-4-amino toluene in 1500 parts water and 239 parts 10N hydrochloric acid by the addition of 70.2 parts sodium nitrite in 500 parts water at a temperature of between 0° and 2° C. The resulting diazonium solution was treated with activated carbon, filtered and made up to 3000 parts with water at 0° C.

A coupling component was prepared from 168.1 parts acetoacetanilide and 8.7 parts 4,7-dihydro-5-methyl-7-oxo-1H-2,3-benzo-1,4-diazepine dissolved in 2000 parts water and 15 parts sodium hydroxide. The pH of the solution was then adjusted to 6.5 (acid reaction to litmus) by the addition of acetic acid, and 32.7 parts sodium acetate dihydrate were added.

The diazonium solution was then added to the coupling component suspension over a 50 minute period avoiding excess diazo. The pH was maintained at 4.5-5.0 by addition of 1N sodium hydroxide solution. The resulting slurry was heated to 70° C., held at 70° C. for 30 minutes and filtered, washed salt free and dried at 50° C.

When the pigment composition so obtained was dispersed in a long oil alkyd resin and white spirit it gave excellent flow and gloss compared to a similar preparation obtained by replacing the benzodiazepine with an equivalent amount of acetoacetanilide.

EXAMPLE 7

The procedure described in Example 6 was repeated except that the coupling component was prepared from 159.3 parts acetoacetanilide and 17.4 parts 4,7-dihydro-5-methyl-7-oxo-1H-2,3-benzo-1,4-diazepine. A similar result to that observed in Example 1 was obtained in a long oil alkyd paint medium.

EXAMPLE 8

The procedure described in Example 6 was repeated except that the benzo-1,4 diazepine was replaced by 2-cyanomethyl benzimidazole.

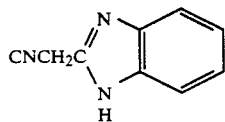

The results obtained in a long oil alkyd paint medium were similar to those observed in Example 1.

EXAMPLE 9

A diazonium compound was prepared according to Example 6 except that the 3-nitro-4-amino toluene was replaced by 169.8 parts 2-nitro-4-chloro-aniline.

The coupling component was as in Example 6 except that the acetoacetanilide was replaced by 201.0 parts acetoacet-o-chloranilide.

The coupled slurry was then treated as in Example 1. The pigment so obtained gave excellent flow and gloss in the long oil alkyd media when compared to a product obtained by replacing 4,7-dihydro-5-methyl-7-oxo-1H-2,3-benzo-1,4-diazepine by a molar equivalent of the acetoacet-o-chloranilide.

EXAMPLE 10

The procedure described in Example 9 was followed except that the coupling component was 195 parts acetoacet-m-xylidide in place of acetoacet-o-chloranilide.

The pigment product so obtained had superior gloss and flow in a long alkyd compared with a similar product in which the 4,7-dihydro-5-methyl-7-oxo-1H-2,3-benzo-1,4-diazepine was replaced by a molar equivalent of acetoacet-m-xylidide.

EXAMPLE 11

A diazonium solution was prepared from 30.4 parts of 3-nitro-4-amino toluene as described in Example 1.

A coupling component solution was prepared by dissolving 35.9 parts of 4,7-dihydro-5-methyl-7-oxo-1H-2,3-benzo-1,4-diazepine in 500 parts of water containing 8.2 parts of sodium hydroxide.

The diazonium and coupling component were coupled together by the method described in Example 1. The resulting benzodiazepine derivative was isolated by filtration, washing and drying at 50° C.

A sample of CI Pigment Yellow 1 was made by coupling a diazonium solution prepared from 30.4 parts of 3-nitro-4-amino toluene with a coupling component solution prepared from 36.2 parts of acetoacetanilide by the method described for Example 1.

When 16 parts of this CI Pigment Yellow 1 were co-milled with 0.8 part of the benzodiazepine derivative prepared by the method described in Example 1 in 22.4 parts of a decorative paint long oil alkyd and 40.6 parts of white spirit much better flow properties were obtained than by milling 16 parts of the CI Pigment Yellow alone in the same formulation. For instance the mill discharge was 85% compared with less than 10%.

EXAMPLE 12

A first diazonium solution, diazonium compound (a), was prepared from 37.1 parts 3-nitro-4-amino-toluene in 600 parts of water by the addition of 61.0 parts 10N hydrochloric acid and 16.8 parts sodium nitrite at a temperature between −2° and 0° C. over about 4 hours. The resulting diazonium compound (a) was treated with activated carbon, filtered and made up to 800 parts with water at 0° C.

A second diazonium solution, diazonium compound (b), was prepared in a similar manner over a 30 minute period from 2.5 parts 3-aminopyridine, 6.75 parts 10N hydrochloric acid, 1.9 parts sodium nitrite and made to 125 parts at 0° C. with water.

A coupling component solution was prepared from 41.2 parts beta-naphthol, 11.5 parts sodium hydroxide and 750 parts of water at 10°-15° C.

Diazonium compounds (a) and (b) were combined and run into the coupling component solution until the pH dropped to 6. The pH was then maintained at 6 without excess diazonium compound being present, by the simultaneous addition of diazonium compound and sodium carbonate solution. When coupling was complete, the pH was adjusted to 8.5 and 6.7 parts of a modified rosin derivative (Beckacite 1624) in solution with 10.3 parts potassium hydroxide and 150 parts water was added. The slurry was then adjusted to pH 6.0 and heated to 60° C., filtered, washed and dried.

21 parts of the pigment composition was ball milled for 16 hours with 19.6 parts of a long oil alkyd and 29.4 parts of white spirit to give a fluid pigment dispersion useful for decorative paint use. Using a standard aperture, 80% of this dispersion could be discharged in 105 sec. A comparison pigment prepared according to the above procedure but utilising 40 parts 3-nitro-4-amino toluene and omitting diazonium compound (b) gave in the same alkyd/white spirit dispersion, 74.4% discharge in 322 secs.

EXAMPLE 13

A pigment derivative was prepared by diazotising, 9.4 parts 3-aminopyridine with 25 parts 10N-hydrochloric acid and 6.9 parts sodium nitrite in 200 parts water at 0° C. This diazonium solution was run into a solution of 14.8 parts beta-naphthol in 300 parts of water and 4.1 parts sodium hydroxide at 15° C.; the pH was maintained at 10-10.3 throughout by addition of the requisite amount of 10% sodium hydroxide solution. Excess diazonium compound was avoided throughout the coupling. The resultant slurry was adjusted to pH 7, filtered, washed free of chloride ion and dried at 50°-55° C.

1.05 parts of this pigment derivative was added to the comparison pigment ball mill formulation of Example 13. After milling, 78% of this dispersion could be discharged in 120 seconds. The product was useful for colouring decorative paint formulations where excellent gloss was obtained.

EXAMPLE 14

A first diazonium solution, diazonium compound (a), was prepared over 1 hour from 31.9 parts 2-methoxy-4-nitroaniline, 47.5 parts 10N-hydrochloric acid and 13.1 parts sodium nitrite in 800 parts of water at 0° C.

A second diazonium solution component, diazonium compound (b), was prepared over a 30 minute period from 1.78 parts 3-aminopyridine, 4.7 parts 10N-hydrochloric acid and 1.5 parts sodium nitrite in 100 parts water at 0° C.

A coupling component was prepared from 28.3 parts bisacetoacet-1,3-phenylenediamine dissolved in 400 parts methyl cellosolve and 8.3 parts sodium hydroxide and then a further 350 parts of methyl cellosolve added. Acetic acid was then added to adjust this solution to pH 6 and 50 parts sodium acetate added. The combined diazos (a) and (b) were then added to this coupling component solution, avoiding excess of diazo throughout the additions. The resultant slurry was filtered, washed chloride free, and dried at 50°-55° C.

21 parts of this pigment were ball milled for 16 hours with 19.6 parts of long oil alkyd and 29.4 parts of white spirit. 81% of this dispersion could be discharged through a standard aperture in 89 seconds.

A comparison pigment was prepared by similar technique but using only one diazo based on 33.6 parts 2-methoxy-4-nitroaniline. 21 parts of this pigment were dispersed into an identical alkyd formulation and 78% could be discharged from the same aperture in 288 seconds. Similarly, when 2.2 parts of the treated pigment were dispersed into 7.8 parts of an alkyd oil ink media, a viscosity of 2,180 poise was obtained compared with a viscosity of 2,620 poise from 2.2 parts of the comparison pigment in the same media.

EXAMPLE 15

A diazonium solution was prepared from 9.4 parts of 3-aminopyridine in 100 parts of water by the addition of 25.6 parts of 10N-hydrochloric acid and 6.9 parts of sodium nitrite at a temperature of between −2° and 0° C. over 1 hour. The resultant diazonium solution was treated with activated carbon, filtered and made to 250 parts with water at 0° C.

A coupling component solution was prepared by dissolving 18.7 parts of acetoacet-2-aminopyridine and 4.5 parts of sodium hydroxide in 200 parts water at a temperature of 18° C.

The coupling component and diazonium solutions were run, at equal rates over 30 minutes, into a coupling vessel containing 200 parts water at 18° C. maintaining a slight excess of coupling component and no excess of diazo at a pH of 4.5-5.0. The resulting pigment was filtered, washed salt free and dried at 55° C.

1 parts of the above pigment was ball milled with 30 parts of C.I. Pigment Yellow 1, 15 parts of a long oil alkyd and 54 parts of white spirit. A fluid dispersion gave a discharge of 92% in less than 30 seconds.

When 30 parts of C.I. Pigment Yellow 1 was ball milled with 15 parts of the long oil alkyd and 55 parts of white spirit a thick dispersion gave a discharge of 70% in 180 seconds which indicates the marked flow improvement due to the pigment derivative. When the two formulations were made up to paints at 10% pigment and 1/5 pigment/binder, the film from the treated product has superior gloss and strength.

EXAMPLE 16

A diazonium suspension was prepared from 9.4 parts of 2-sulpho-4-methylaniline dissolved in 100 parts of water containing 2.12 parts of sodium hydroxide, by the addition of 3.5 parts of sodium nitrite and 17.4 parts of 10N-hydrochloric acid at a temperature of between 0° and 5° C. over 15 minutes.

A coupling component solution was prepared by dissolving 9.34 parts of acetoacet-2-aminopyridine and 2.5 parts of sodium hydroxide in 200 parts of water at a temperature of 18° C.

The coupling component and diazonium suspension were run in over 30 minutes at equivalent rates into a coupling vessel containing 200 parts water at 18° C. maintaining an excess of coupling component and a pH of between 4.5 and 5.0. The resultant slurry was adjusted to pH 9-10 and filtered, washed salt free and dried at 55° C.

1 part of the above derivative was ball milled with 30 parts of C.I. Pigment Yellow 1, 15 parts of a long oil alkyd and 54 parts of white spirit. A fluid dispersion resulted giving a discharge of 90.4% in less than 30 seconds. However, when 30 parts of C.I. Pigment Yellow 1 was ball milled with 15 parts of long oil alkyd and 55 parts of white spirit, a thick dispersion resulted giving a discharge of 70% in 180 seconds.

When the pigment dispersion so obtained was incorporated into a paint medium its properties in the paint film were similar to those of the pigment dispersion of Example 15.

EXAMPLE 17

The procedure and comparison was as for Example 16 except that the pigment derivative was isolated from the slurry at pH 3.

The pigment derivative so obtained was incorporated into a paint medium and showed similar properties to the pigment derivative of Example 16.

What is claimed is:
1. A pigment composition comprising:
(a) an organic pigment selected from the group consisting of phthalocyanine, quinacridone, anthraquinone, and azo pigments; and
(b) an azo compound of the formula

A—[N=N—B]$_n$ wherein n is 1 or 2,

A and B are radicals of either a coupling component or a diazo component, wherein the coupling component is selected from the group consisting of acetoacetyl arylamide, 1-alryl-pyrazol-5-one, β-naphthol, 3-hydroxy-2-naphthoic acid anilide, 1,3- or 1,4-bisacetoacetyl-phenylene diamine or wherein each of said acetoacetyl arylamide, 1-aryl-pyrazol-5-one, β-naphthol, 3-hydroxy-2-naphthoic acid anilide or 1,3- or 1,4-biasacetoacetyl-phenylene diamine is substituted by chloro, bromo, alkyl having 1 to 6 carbon atoms, alkoxy having 1 to 6 carbon atoms, nitro, carboxylic acid, sulphonic acid, alkali metal carboxylate, alkali metal sulphonate, or arylazo, and a compound of the formula

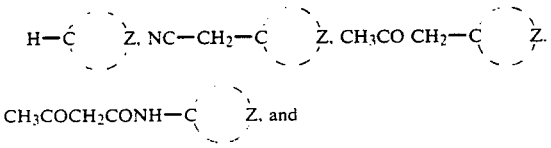

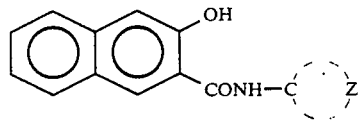

wherein

Z is a group of atoms necessary to complete a benzimidazole, pyridine, benzodiazepine, quinoline, isoquinoline or naphthimidazole group; and the diazo component is derived from an amine A(NH$_2$)$_n$ or B(NH$_2$) where A and B are selected from the group consisting of naphthyl, phenyl, diphenyl, or wherein said naphthyl, phenyl, and diphenyl are each substituted by chloro, bromo, alkyl having 1 to 6 carbon atoms, alkoxy having 1 to 6 carbon atoms, nitro, carboxylic acid, sulfonic acid, alkali metal carboxylate, alkali metal sulphonate, or arylazo and a compound of the formula,

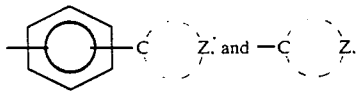

provided where A is the coupling component, B is the diazo component, when A is the diazo component, B is the coupling component and azo compound (b) must contain at least one benzimidazole, pyridine, benzodiazepine, quinoline, isoquinoline or naphthimidazole group;

wherein said azo compound is present in an amount of from 0.5% to 20% by weight, based upon the weight of said organic pigment(a).

2. A pigment composition as claimed in claim 1 wherein the organic pigment is an azo pigment.

3. A pigment composition as claimed in claim 2 wherein the azo pigment is an arylamide azo pigment.

4. A pigment composition as claimed in claim 1 wherein A is derived from an amine A(NH$_2$)$_n$ wherein n is 1 or 2.

5. A pigment composition as claimed in claim 4 wherein A is naphthyl, phenyl, diphenyl, or wherein said naphthyl, phenyl, and diphenyl are each substituted by chloro, bromo, alkyl having 1 to 6 carbon atoms, alkoxy having 1 to 6 carbon atoms, nitro, carboxylic acid, sulphonic acid, alkali metal carboxylate, alkali metal sulphonate, or arylazo.

6. A pigment composition as claimed in claim 1 wherein n is 1 and A is acetoacetyl arylamide, 1-aryl-pyrazol-5-one, β-naphthol, 3-hydroxy-2-naphthoic acid anilide, or wherein each of said acetoacetyl arylamide, 1-aryl-pyrazol-5-one, β-naphthol or 3-hydroxy-2-naphthoic acid anilide is substituted by chloro, bromo, alkyl having 1 to 6 carbon atoms, alkoxy having 1 to 6 carbon atoms, nitro, carboxylic acid, sulphonic acid, alkali metal carboxylate, alkali metal sulphonate, or arylazo.

7. A pigment composition as claimed in claim 1 wherein n is 2 and A is 1,3- or 1,4-bisacetoacetyl-phenylene diamine, or wherein each of said 1,3- or 1,4-bisacetoacetyl-phenylene diamine is substitute by chloro, bromo, alkyl having 1 to 6 carbon atoms, alkoxy having 1 to 6 carbon atoms, nitro, carboxylic acid, sulphonic acid, alkali metal carboxylate, alkali metal sulphonate, or arylazo.

8. A pigment composition as claimed in claim 1 wherein A is the radical of a diazo component of the formula:

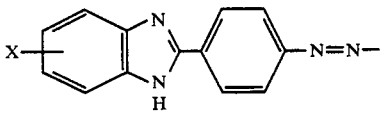

wherein X is a hydrogen, halogen, 1-6C alkyl, 1-6C alkoxy, nitro, carboxylic acid, sulphonic acid, alkali metal carboxylate, alkali metal sulphonate or arylazo.

9. A pigment composition as claimed in claim 1 wherein B is the radical of a coupling component of the formula

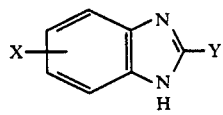

wherein X is hydrogen, halogen, 1-6C alkyl, 1-6C alkoxy, nitro, carboxylic acid, sulphonic acid, alkali metal carboxylate, alkali metal sulphonate or arylazo groups and Y is —CH$_2$—CN, —CH$_2$—COCH$_3$, or —NHCOCH$_2$—COCH$_3$.

10. A pigment composition as claimed in claim 1 wherein A is the radical of a diazo component of the formula

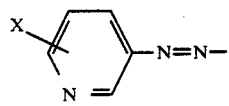

wherein X is hydrogen, halogen, 1-6C alkyl, 1-6C alkoxy, nitro, carboxylic acid, sulphonic acid, alkali metal carboxylate, alkali metal sulphonate or arylazo group.

11. A pigment composition as claimed in claim 1 wherein B is the radical of a coupling component of the formula

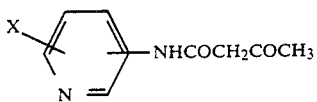

wherein X is hydrogen, halogen, 1-6C alkyl, 1-6C alkoxy, nitro, carboxylic acid, sulphonic acid, alkali metal carboxylate, alkali metal sulphonate or arylazo group.

12. A pigment composition as claimed in claim 1 wherein B is the radical of a coupling component of the formula

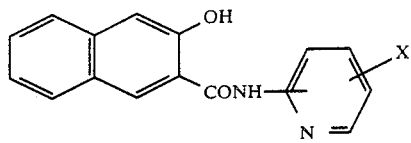

wherein X is hydrogen, halogen, 1-6C alkyl, 1-6C alkoxy, nitro, carboxylic acid, sulphonic acid, alkali metal carboxylate, alkali metal sulphonate or arylazo group.

13. A pigment composition as claimed in claim 1 wherein B is the radical of a coupling component of the formula

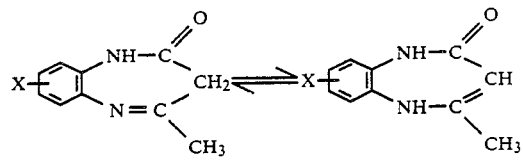

wherein X is hydrogen, halogen, 1-6C alkyl, 1-6C alkoxy, nitro, carboxylic acid, sulphonic acid, alkali metal carboxylate, alkali metal sulphonate or arylazo group.

14. A surface coating containing a pigment composition as claimed in claim 1.

15. A surface coating as claimed in claim 14 wherein the surface coating is a gravure ink, a viscous printing ink or a long or short oil alkyd paint.

* * * * *